United States Patent [19]

Rabinow

[11] 4,118,702
[45] Oct. 3, 1978

[54] DOPPLER DISTANCE MEASURING SYSTEM

[75] Inventor: Jacob Rabinow, Takoma Park, Md.

[73] Assignee: The United States of America as represented by the Secretary of the Army, Washington, D.C.

[21] Appl. No.: 808,277

[22] Filed: Apr. 22, 1959

[51] Int. Cl.$^2$ ............................ G01S 7/42; G01S 9/46
[52] U.S. Cl. ...................................... 343/7 PF; 343/8
[58] Field of Search ..................... 343/7, 13, 8, 7 PF; 102/70.2 P; 324/68, 70

[56] References Cited

U.S. PATENT DOCUMENTS

| | | | |
|---|---|---|---|
| 2,537,569 | 1/1951 | Ballard | 343/13 |
| 2,891,245 | 6/1959 | Coogan et al. | 343/8 |
| 2,939,004 | 5/1960 | Cole et al. | 343/8 |
| 3,004,219 | 10/1961 | Albert | 343/8 |
| 3,011,166 | 11/1961 | Fell et al. | 343/8 |

Primary Examiner—Malcolm F. Hubler
Attorney, Agent, or Firm—Nathan Edelberg; Robert P. Gibson; Saul Elbaum

EXEMPLARY CLAIM

1. A system for measuring the distance to a target comprising: means for transmitting a signal to said target and for receiving a return signal from said target, means for mixing said transmitted signal and said return signal to produce a doppler signal, means connected to said mixing means and responsive to said doppler signal for initiating a first voltage timing function, means having a signal input connected to said mixing means and responsive to said doppler signal and a gating input responsive to said first timing function for initiating a second voltage timing function when said doppler signal reaches a predetermined value, and means connected to said means for initiating a second voltage timing function and responsive to said second timing function for producing a signal when said target is at a predetermined distance from said transmitting and receiving means.

5 Claims, 5 Drawing Figures

DOPPLER DISTANCE MEASURING SYSTEM

The invention described herein may be manufactured and used by or for the Government for governmental purposes without the payment to me of any royalty thereon.

This invention relates to the measurement of distance by means of doppler principles, and more particularly in relation to the use thereof in proximity fuzing systems.

The utilization of the doppler effect is well known to the art of proximity fuzes. In prior art missile proximity fuze systems, a doppler signal is derived by comparing in an oscillating detector, the transmitted wave with the wave reflected from a target. In such systems detonation is initiated when the doppler signal is in a predetermined frequency range and reaches a predetermined amplitude. For a given type of missile used against a target having a given reflection coefficient, the choice of the frequency range and amplitude of the doppler signal which initiates detonation determines the predetermined altitude at which detonation occurs.

Although missile detonation at a fixed altitude is usually desired, the wide range of target reflection coefficients, differing by as much as 10 to 1 in some cases, causes a wide variation in the altitude at which the doppler signal reaches the predetermined amplitude which initiates detonation. The result is that where a missile is intended for use against targets having varying reflection coefficients (as is usually the case), and a reliable detonation altitude is important, the use of the advantageously simple doppler proximity fuze must be discarded in favor of more complicated fuzing systems (such as those based on frequency modulation effects) which are capable of reliably providing detonation at a desired altitude.

Accordingly, it is the principal object of this invention to provide a doppler fuzing system which will reliably initiate detonation at a desired altitude regardless of the reflection coefficient of the target.

It is another object to provide a system for measuring distance employing doppler principles which is independent of the reflection coefficient of the target.

To provide a doppler distance measuring system which is independent of the reflection coefficient of the target, this invention makes use of the relationship that the amplitude of the doppler signal at the output of a conventional oscillating detector is substantially inversely proportional to altitude for all target reflection coefficients. In an embodiment of a missile doppler fuzing system based upon the above relationship, means are provided for starting a linear timing function when the doppler signal at the output of a conventional oscillating detector reaches a predetermined amplitude. When the doppler signal reaches twice the predetermined amplitude, the timing function is reversed. From the above relationship, it will be realized that when the amplitude signal has doubled, the distance to the target has halved. Thus, if the velocity of approach to the target is substantially constant, after a time interval equal to that during which the doppler signal doubled, the missile should collide with the target. Knowing the missile velocity, means are provided to initiate detonation of the missile at a predetermined time before this time interval has passed, thereby causing detonation at a desired altitude.

It can be seen that the above-described typical embodiment requires a known and constant missile velocity. This requirement offer no problem in the great majority of cases, first because a falling missile is known to reach a constant velocity (called terminal velocity) at a high enough altitude so as to make the assumption of constant velocity valid; and second, because for any given type of missile, this constant velocity can be predicted or experimentally determined with considerable accuracy. Where a given fuze is to be used on missiles having different terminal velocities, means responsive to the doppler frequency may be provided to vary the predetermined time which determines the detonation altitude, so that detonation will occur at the same altitude regardless of the terminal velocity of the missile.

The specific nature of the invention, as well as other objects, uses and advantages thereof, will clearly appear from the following description and from the accompanying drawing, in which.

Figure 1:
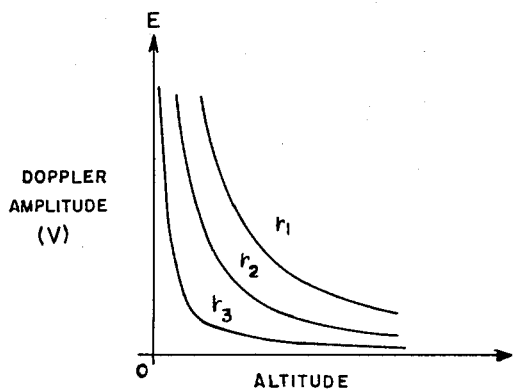
FIG. 1 is a graph of doppler amplitude $V$ vs. altitude $h$ for targets having various reflection coefficients.

In FIG. 1, a series of curves are shown representing the relationship between the doppler signal amplitude $V$ and the altitude $h$ for targets having progressively smaller reflection coefficients $r_1$, $r_2$, $r_3$. From these curves, it is clearly evident that if the doppler signal amplitude $V$ is used for detonation of a missile as done in prior art systems, a change in the reflection coefficient $r$ greatly changes the detonation altitude. In accordance with the present invention the problem of obtaining a constant detonation altitude is overcome by making use of the fact that although the individual values on each of the curves is different for different reflection coefficients, the curves have the same shape regardless of the reflection coefficient. The curves have been found to be substantially hyperbolas so that the mathematical relationship between the doppler signal amplitude $V$, the altitude $h$, and the target reflecting coefficient $r$ may be expressed as follows:

$V = Kr/h$ where $K$ is a constant proportionality factor.

Because of the above-expressed hyperbolic relationship, it has been discovered that if the time interval is determined between two doppler signals whose amplitudes have a predetermined known proportion, the altitude may be determined from then on if the velocity of approach is known and constant, or if changes in velocity can be compensated for by observing the frequency of the doppler signal which is proportional to velocity. Although this discovery may be applied to a wide variety of distance-measuring systems, it is believed that a description of the following preferred embodiment illustrated in FIG. 2 of a doppler missile fuzing system in accordance with the invention will be sufficient to enable those skilled in the art to apply the invention to any desired distance-measuring system.

Figure 2:
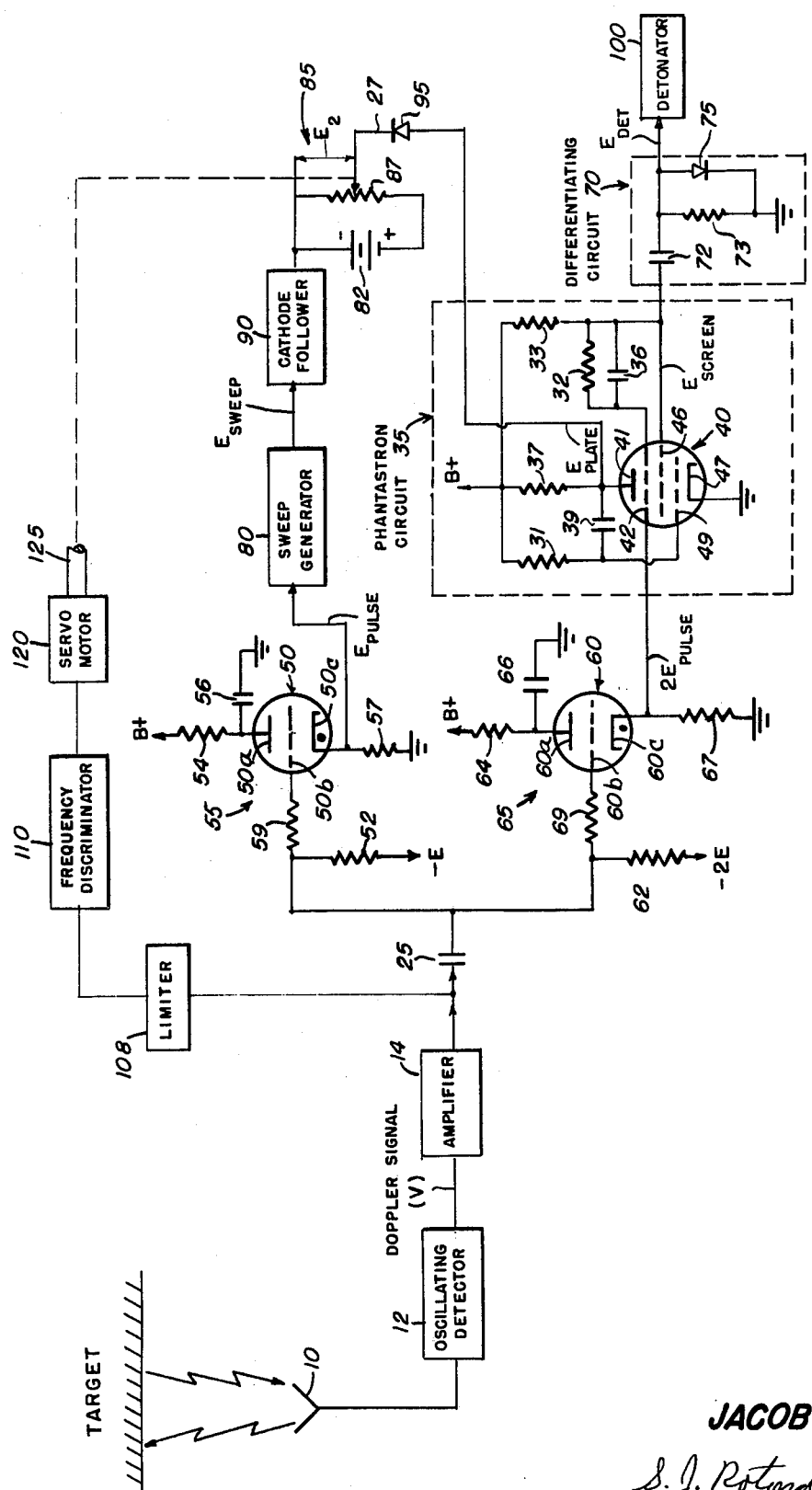
FIG. 2 is a circuit and block diagram of an embodiment of a missile doppler proximity fuzing system in accordance with the invention. The light lined elements indicate additional means which are incorporated in an expanded form of the invention.

In FIG. 2, an antenna 10 which radiates and receives energy reflected from a target is connected to a conventional oscillating detector 12 in accordance with well known practice. The doppler signal of amplitude ($V$) obtained at the output of the oscillating detector 12 is fed to an amplifier 14 having a bandwidth chosen for the range of doppler frequencies to which response is desired. The output of the amplifier 14 is fed through a coupling capacitor 25 to two parallel switching circuits 55 and 65. The output of the amplifier 14 is also fed to the frequency discriminator 110 (as shown by the light lined portions) in connection with an expanded form of the invention which will be described later.

The switching circuit 55 includes a thyratron tube 50 having a plate 50a, a grid 50b, and a cathode 50c. A resistor 54 is connected between the plate 50a and a d-c voltage source B+, a capacitor 56 is connected between the plate 50a and circuit ground, a resistor 57 is connected between the cathode 50c and circuit ground, and the series combination of the resistors 59 and 52 is connected between the grid 50b and a bias voltage source −E.

The switching circuit 65 includes a thyratron tube 60 having a plate 60a, a grid 60b, and a cathode 60c. A resistor 64 is connected between the plate 60a and B+, a capacitor 66 is connected between the plate 60a and circuit ground, a resistor 67 is connected between the cathode 60c and circuit ground, and the series combination of the resistors 69 and 62 are connected between the grid 60b (and a bias voltage source)—2E.

Figure 3:
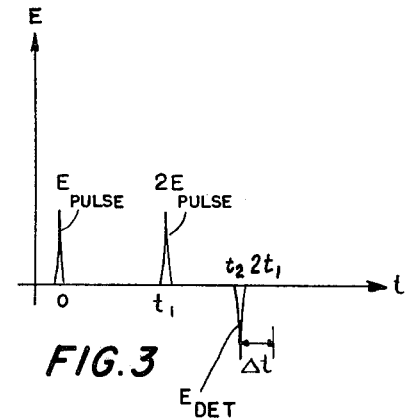
FIGS. 3–5 are graphs used in describing the operation of the embodiment of FIG. 2.

It can be seen that the switching circuits 55 and 65 are the same except that the thyratron 50 of the switching circuit 55 is kept cut-off by a bias −E, while the thyratron 60 of the switching circuit 65 is kept cut-off by a bias −2E equal to double the bias −E on the thyratron 50. The doppler signal coupled from the capacitor 25 is applied to the switching circuits 55 and 65 at the junctions of the resistors 52 and 59 and resistors 62 and 69, respectively. The components of the switching circuits 55 and 65 are chosen in accordance with well known practice so that when the doppler signal amplitude is substantially equal to −E, the thyratron 50 of the switching circuit 55 fires, causing the capacitor 56 to rapidly discharge, producing a switching pulse $E_{pulse}$ at the cathode 50c; and when the doppler signal amplitude is substantially equal to −2E, the thyratron 60 of the switching circuit 65 fires, causing the capacitor 66 to rapidly discharge, producing a switching pulse $2E_{pulse}$ at the cathode 60c. The pulses $E_{pulse}$ and $2E_{pulse}$ obtained for a particular doppler signal build-up are shown in FIG. 3. The $E_{pulse}$ will be assumed to occur at zero time and the $2E_{pulse}$ at the time $t_1$ as shown.

The $E_{pulse}$ output of the switching circuit 55 is fed to a sweep generator 80 adapted to produce a linear output voltage $E_{sweep}$ when triggered by the switching pulse $E_{pulse}$. The output of the sweep generator 80 is fed to a cathode follower 90 to provide a low output voltage which rises linearly from zero volts in a positive direction. Suitable sweep generators and cathode followers for the above-described purpose are well known in the art and can readily be provided.

The output of the cathode follower 90 is fed to an adjustable negative d-c voltage source 85 which may comprise a battery 82 and a potentiometer 87 connected in a conventional manner. The negative d-c voltage source 85 applies a negative voltage −$E_2$ in series with the positively rising output of the cathode follower 90. The output of the voltage source 85 is fed through a diode 95 to control the rundown time of a phantastron circuit 35 as will hereinafter be described.

The $2E_{pulse}$ output of the switching circuit 65 is fed to the screen-coupled phantastron circuit to cause triggering thereof. The phantastron circuit 35 comprises a vacuum tube 40 having a plate 41, a suppressor 42, a screen grid 46, a control grid 49, and a grounded cathode 47. The tube 40 is of the type conventionally used in phantastron circuits, such as a 6AS6 tube, for example. A resistor 37 is connected between B+ and the plate 41 of the tube 40, a resistor 31 is connected between B+ and the control grid 49, and a resistor 33 is connected between B+ and the screen grid 46. A capacitor 39 is connected between the plate 41 and the control grid 49, while a capacitor 36 in parallel with a resistor 32 is connected between the suppressor grid 42 and the screen grid 46. The values of these components of the phantastron circuit 35 are chosen in accordance with well known principles to provide conventional screen-coupled phantastron operation. A typical screen-coupled phantastron circuit of this type with exemplary values is shown on page 197, FIG. 5.46 of the Massachusetts Institute of Technology, Radiation Laboratory Series, volume 19, entitled "Waveforms."

Figure 4:
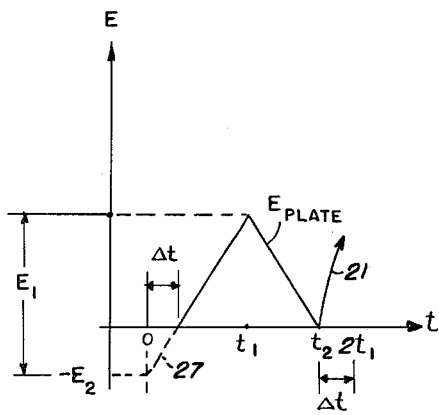
Figure 5:
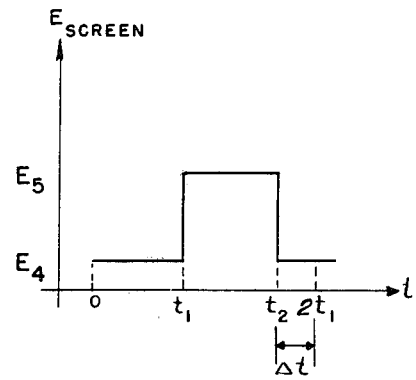

The operation of the screen-coupled phantastron circuit 35 is illustrated by the graphs of FIGS. 3–5. For the purposes of explanation, the $E_{pulse}$ from the switching circuit 55 will be assumed to occur at zero time as shown in FIG. 3. When the sweep generator 80 is triggered by the $E_{pulse}$, the resultant voltage output of the voltage source 85 at lead 27 will be as shown by the dotted curve 27 in FIG. 4. It will be seen that this dotted curve starts out at zero time at the negative voltage −$E_2$, and begins to rise linearly in accordance with the sweep output of the cathode follower 90. It will be evident that the value of this initial negative voltage −$E_2$ is determined by the negative voltage inserted in series with the sweep output of the cathode follower 90 by the adjustable voltage source 85.

The diode 95 has its cathode connected to the lead 27 and its plate connected to the plate 41 of the phantastron tube 40. The voltage $E_{plate}$ on the plate 41 of the phantastron tube 40 is illustrated by the solid curve in FIG. 4 and because of diode 95 remains at zero volts while the voltage on lead 27 is negative. As the voltage on lead 27 rises above zero, the voltage $E_{plate}$ follows the voltage on lead 27 and both are shown superimposed in FIG. 4.

When the doppler signal amplitude doubles at time $t_1$, the $2E_{pulse}$ is produced, triggering the phantastron circuit 35. It will be understood that in accordance with well known phantastron operation, when the phantastron circuit 35 is triggered, the voltage $E_{plate}$ on the plate 41 immediately begins to fall at a linear rate from the voltage to which it had risen to in following the voltage on the lead 27, as shown in FIG. 4. The diode 95 serves to disconnect the voltage at the lead 27 from the voltage $E_{plate}$ on the plate 41 when it begins to fall linearly. This linear fall of the voltage $E_{plate}$ continues until the plate voltage "bottoms" at time $t_2$, that is, runs against the "knee" in the plate curve. This "bottoming" occurs very close to zero volts and may be considered as such for the purposes of this explanation. The rate of fall of the phantastron plate voltage $E_{plate}$ is preferably chosen to be substantially equal to the rate of rise of the linearly rising voltage $E_{sweep}$ of the sweep generator 80. It is well known that this rate of fall of $E_{plate}$ in a phantastron circuit is essentially determined by the time constant provided by the resistor 31 and the capacitor 39. After "bottoming" at time $t_2$, the plate voltage $E_{plate}$ then rapidly rises, as indicated by the curve 21 in FIG. 4, towards the value to which the voltage on lead 27 has risen.

As can be seen from FIG. 5, when the phantastron circuit 35 is triggered at the time $t_1$, the voltage $E_{screen}$ on the screen grid 46 immediately rises from its initial value of $E_4$ to some higher value $E_5$, and remains at the value $E_5$ until the plate "bottoms" at time $t_2$, whereupon the screen voltage $E_{screen}$ then immediately falls to its initial value $E_4$. The screen grid 46 is connected to a differentiating circuit 70 comprising a capacitor 72 connected to circuit ground through the parallel combination of a resistor 73 and a diode 75 poled to short out positive signals. The differentiating circuit 70 thus provides substantially no output pulse when the screen grid voltage $E_{screen}$ immediately rises from $E_4$ to $E_5$ at the time $t_1$, but when the screen grid voltage $E_{screen}$ immediately returns to its initial voltage $E_4$ when "bottoming" occurs, a negative pulse $E_{det}$ (see FIG. 3) appears at the output of the differentiating circuit 70. This negative pulse $E_{det}$ is fed to a conventional detonator 100 in any well known manner to cause activation thereof.

From the foregoing description it can be seen that when the doppler signal amplitude V reaches a first amplitude E, at zero time, a first switching circuit 55 triggers a first timing function provided by a sweep generator 80 whose output is fed to a cathode follower 90 to provide a low impedance output voltage which rises linearly from zero in a positive direction. An adjustable negative voltage $-E_2$ is applied in series with this linearly rising voltage and the resultant voltage combination then applied to control the plate voltage of a screen-coupled phantastron circuit 35.

When the doppler signal amplitude doubles reaching a second amplitude 2E, a second switching circuit 65 triggers the phantastron circuit 35, at time $t_1$ which effectively reverses the timing function, since the phantastron plate voltage $E_{plate}$ begins to fall at a linear rate from the voltage it has risen to in following the output of the linearly rising voltage in series with the negative voltage $-E_2$. It can be seen that this voltage to which $E_{plate}$ has risen when triggering occurs is thus directly dependent upon the value of $E_2$ inserted. The rate of fall of the plate voltage $E_{plate}$ is preferably made equal to the rate of rise of the linearly rising voltage produced by the sweep generator 80. When the plate voltage $E_{plate}$ falls to substantially zero at time $t_2$, the rise of the screen voltage $E_{screen}$ is formed into a pulse $E_{det}$ by the differentiating circuit 70 to activate the detonator 100.

It will be understood that if the inserted negative voltage $-E_2$ were made zero and the rates of rise and fall of the sweep generator 80 and the phantastron circuit 35, respectively, are equal, the time $t_2$ at which the $E_{det}$ pulse occurs will be equal to $2t_1$; that is, the time interval $t_1$ during which the doppler signal amplitude doubles will be equal to $t_2 - t_1$ which is the time interval between the time $t_1$ at which the double doppler signal is reached and the time $t_2$ at which the pulse $E_{det}$ is produced. From the aforementioned relationship between the doppler signal amplitude V and the altitude h, it will be understood, therefore, that for constant velocity of approach to the target, and no negative voltage $-E_2$ inserted, detonation will occur substantially upon collision with the target. This is because, from the above relationship, when the doppler signal amplitude doubles the distance to the target halves.

It thus becomes evident that adjustment of the value of the negative voltage $-E_2$ inserted, adjusts the amount of time $\Delta t = 2t_1 - t_2$ (see FIG. 4), prior to the time $2t_1$ at which detonation will take place. This can be seen to be the case because the voltage to which the $E_{plate}$ rises before the phantastron circuit 35 triggers is directly reduced by the value $-E_2$; and since the reverse time interval $t_2 - t_1$ is directly proportional to the voltage of $E_{plate}$ at triggering, the time $\Delta t$ will be directly proportional to the voltage $-E_2$ inserted. Knowing the terminal velocity of the missile approach to the target, therefore, one skilled in the art can thus adjust the rate of fall of the phantastron plate voltage and the value of the inserted negative voltage $-E_2$ to provide detonation at a desired altitude.

Where the above-described embodiment in accordance with the invention is to be used on missiles having different terminal velocities, it will be understood that because a given value of $-E_2$ produces a given value of $\Delta t$, different detonation velocities will produce different detonation heights. To overcome this difficulty means may be provided for adjusting the amount of inserted negative voltage $-E_2$ to provide the correct value of $\Delta t$ for each terminal velocity which will give the same detonation height. The light lined elements in FIG. 2 show means which may be employed for accomplishing this adjustment of the voltage $-E_2$.

The amplified doppler signal output from the amplifier is fed to a limiter 108 and then to a conventional form of frequency discriminator 110 which produces an output whose amplitude is proportional to the frequency of the doppler signal. The output of the frequency discriminator 110 is fed to a servo motor 120, which is also of conventional form. The servo motor is so constructed and arranged that the angular position of its output shaft 125 is controlled in response to the amplitude of the output of the frequency discriminator 110. The above may be accomplished in accordance with well known practice in the art of servomechanisms. The variable arm of the potentiometer 87 is mechanically coupled (as indicated by the dashed line in FIG. 2) to the shaft 125 of the servo motor so that the voltage $-E_2$ inserted by the source 85 is increased as the doppler frequency increases (corresponding to an increase in missile velocity) and is decreased as the doppler frequency decreases (corresponding to a decrease in missile velocity). The amount of increase or decrease with changes in the doppler frequency is chosen so that for the rate of fall of the phantastron plate voltage $E_{plate}$ provided, the interval $\Delta t$ produced will provide the same detonation altitude regardless of the terminal velocity of the missile. Since the time $\Delta t$ required to provide a given detonation altitude is inversely proportional to the missile terminal velocity, the necessary relation between the angular rotation of the servo motor shaft 125 and the change in position of the variable arm of the potentiometer 87 can readily be determined for a given choice of rate of fall of the phantastron plate voltage $E_{plate}$.

it is to be understood as brought out previously that this invention is not limited to the particular embodiment illustrated in FIG. 2. For example, those skilled in the art will appreciate that the invention may be applied to a radio altimeter system as well as to a fuzing system.

It is also to be understood that the particular switching circuits, timing means, and the 2 to 1 relationship of doppler amplitudes employed in the embodiment of FIG. 2 are only illustrative of a preferred embodiment.

It will be apparent, therefore, that the embodiment shown is only exemplary and that various modifications can be made in construction and arrangement within the scope of the invention as defined in the appended claims.

I claim as my invention:

1. A system for mesuring the distance to a target comprising: means for transmitting a signal to said target and for receiving a return signal from said target, means for mixing said transmitted signal and said return signal to produce a doppler signal, means connected to said mixing means and responsive to said doppler signal for initiating a first voltage timing function, means having a signal input connected to said mixing means and responsive to said doppler signal and a gating input responsive to said first timing function for initiating a second voltage timing function when said dopper signal reaches a predetermined value, and means connected to said means for initiating a second voltage timing function and responsive to said second timing function for producing a signal when said target is at a predetermined distance from said transmitting and receiving means.

2. The system of claim 1 including biasing means for controlling the voltage level at which said second voltage timing function is initiated.

3. The system of claim 2 wherein said biasing means is variable and means responsive to the frequency of said doppler signal for controlling the bias provided by said biasing means.

4. A missile fuzing system adapter to detonate a missile at a predetermined altitude, said fuzing system comprising in combination: means for transmitting radiofrequency energy towards the earth, receiving reflected energy therefrom, and mixing the transmitted and received energy to produce a doppler signal representative of the relative velocity between the missile and the earth, generating means for producing a voltage at its output which rises positively at a known rate, means for initiating said generating means when the doppler signal reaches a first amplitude, a phantastron circuit, means for triggering said phantastron circuit when the doppler signal reaches a second amplitude which is substantially twice the amplitude of said first amplitude, the triggering of said phantastron circuit causing its screen voltage to immediately rise to a higher value and its plate voltage to fall linearly until "bottoming" occurs whereupon the screen grid voltage immediately falls to its initial value, an adjustable d-c voltage source, means for connecting said phantastron circuit to said generating means and said source so that when said phantastron is triggered the plate voltage of said phantastron circuit has a value determined by the voltage to which the output voltage of said generating means has risen in series with an opposing d-c voltage provided by said source, said opposing d-c voltage being chosen in accordance with the inverse relationship between the altitude and the amplitude of the doppler signal so that when "bottoming" occurs the missile is at a predetermined altitude, and means connected to said phantastron circuit for producing a pulse to initiate detonation of the missile in response to the immediate fall of said screen voltage of its initial value at "bottoming."

5. The invention in accordance with calim 4, there being additionally provided: means responsive to the frequency of said doppler signal for adjusting the opposing d-c voltage provided by said source to a value which will compensate for different relative velocities between the missile and the earth.

* * * * *